US007684560B2

(12) United States Patent
Sung et al.

(10) Patent No.: US 7,684,560 B2
(45) Date of Patent: Mar. 23, 2010

(54) EARSET

(75) Inventors: Kyung-Eun Sung, Seoul (KR); Sang-Min Hyun, Seoul (KR); Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 497 days.

(21) Appl. No.: 11/788,922

(22) Filed: Apr. 23, 2007

(65) Prior Publication Data

US 2008/0013714 A1 Jan. 17, 2008

(30) Foreign Application Priority Data

Apr. 21, 2006 (KR) ..................... 10-2006-0036437

(51) Int. Cl.

| | |
|---|---|
| ***H04M 1/00*** | (2006.01) |
| ***H04M 9/00*** | (2006.01) |
| ***H04R 25/00*** | (2006.01) |

(52) U.S. Cl. .................... 379/430; 381/370; 455/575.2

(58) Field of Classification Search ................ 379/430; 381/370, 374, 375, 376; 455/575.2

See application file for complete search history.

(56) References Cited

FOREIGN PATENT DOCUMENTS

| | | |
|---|---|---|
| JP | 2004-118393 | 4/2004 |
| JP | 2005-269585 | 9/2005 |
| KR | 20-0393227 | 8/2005 |

*Primary Examiner*—Tuan D Nguyen

(74) *Attorney, Agent, or Firm*—The Farrell Law Firm, LLP

(57) ABSTRACT

An earset including a main housing with a microphone and an ear speaker mounted therein; a cover rotatably connected to the main housing and rotating along a first hinge axis to expose or close the ear speaker, the ear speaker being exposed with rotation of the cover and rotating along a second hinge axis to be protruded out from the main housing and fitted into the ear of a user; and first and second hinge devices providing the first and second hinge axes, respectively, and rotatably connecting the cover and the ear speaker to the main housing.

14 Claims, 13 Drawing Sheets

EARSET

PRIORITY

This application claims priority to an application filed with the Korean Intellectual Property Office on Apr. 21, 2006 and assigned Serial No. 2006-36437, the disclosure of which is incorporated herein by reference.

BACKGROUND OF THE INVENTION

1. Field of the Invention

The present invention generally relates to an earset, and more particularly to an earset having a cover for covering or exposing an ear speaker according to its rotation or attachment/detachment.

2. Description of the Related Art

Generally, mobile terminals refer to handheld devices which are capable of providing a user and another party with wireless communication service, and include Hand Held Phones (HHPs), Cordless Telephone 2 (CT-2) cellular phones, digital phones, Personal Communication Services (PCS) phones and Personal Digital Assistants (PDAs). Mobile terminals can be classified into a bar type, a flip type and a folder type according to their outward appearances. A bar-type mobile terminal has a bar-shaped single housing. A flip-type mobile terminal has a bar-shaped housing and a flip cover rotatably connected to the housing. A folder-type mobile terminal has a bar-shaped housing and a folder rotatably connected to the housing by means of a hinge device. Also, depending on where a user carries a mobile terminal, mobile terminals can be classified into a neck wearable type or a wrist type. A neck wearable type can be worn around the neck and a wrist type on the wrist.

FIG. 1 shows a conventional folder-type mobile terminal. The folder-type mobile terminal includes a main housing 1 and a folder 2. The main housing 1 includes a plurality of keys 1*a* and a microphone 1*b*. The folder 2 includes a Liquid Crystal Display (LCD) display unit 2*a* and a speaker 2*b*. A hinge device 3 is installed between the main housing 1 and the folder 2 in order to rotatably connect the folder 2 to the main housing 1, thereby allowing the folder 2 to be opened up to an angle of about 145° to 155°. Also, the folder-type mobile terminal includes an antenna (not shown) at the top portion of the main body 1.

Keeping pace with the trend toward small and slim designs, various earsets are generally used to improve portability of the small and slim communication/audio devices, such as mobile phones, portable cassette players, Moving Picture Expert Group Layer 3 (MP3) players, portable radios.

An earset 10 in FIG. 1 includes an ear microphone and a headset with a Bluetooth function. The earset 10 can be a necklace type or an ear-hook type (not shown) which can be fitted around the ear.

As shown in FIG. 1, the necklace-type earset 10 further includes a necklace string 11 which can be worn around the neck of a user. A speaker 20 of a predetermined length is connected to a predetermined portion of the string 11. A mouthpiece 30 integrally including a casing 31, a microphone 32 and a transceiver button 33 for sending or receiving a signal to or from the main body 1 is provided at another predetermined portion of the string 11. An earset jack 41 which is electrically connected to the main body 1 and a knot string 42 which can be tied on top of the main body 1 are provided at a lower portion of the string 11. Also, a connecting member 40 is integrally coupled to the string 11.

Such a conventional necklace-type earset has an exposed speaker portion. The exposed speaker is easily breakable by a contact, and can be contaminated with dust or dirt. The speaker and the mouthpiece provided altogether on the earset string increase the overall volume of the earset.

An ear-hook type earset has a pair of ear hooks which can be fitted over both ears of a user. Each ear hook having a hook shape is closely fitted over the apex of the ear.

However, the ear hooks for over-the-ear use may deteriorate the appearance of the ear-hook type earset and increase the earset size. To carry the earset in a bag, sufficient space is needed due to the irregular protruding shape of the ear hooks. Also, the speaker provided in each ear hook is always exposed, making it easily breakable by an external impact.

The speaker which should be fitted into the ear is protruded outward, which further increases the overall size of the earset. Also, the exposed cover of the speaker is easily damaged and contaminated.

Since no separate casing is provided to contain the ear-hook type earset, the user has to carry the earset in their hands or put it somewhere after using the earset. Therefore, the ear-hook type can be easily lost.

SUMMARY OF THE INVENTION

Accordingly, the present invention has been made to solve the above-mentioned problems occurring in the prior art, and an object of the present invention is to provide an earset having a cover for covering or exposing an ear speaker according to it rotation or attachment/detachment, thereby improving the appearance of the earset and preventing contamination or damage to the ear speaker.

Another object of the present invention is to provide an earset capable of rotating an ear speaker to be fitted into the ear of a user according to the opening of a cover, thereby protecting the ear speaker and facilitating the use of the ear speaker.

Still another object of the present invention is to provide an earset having an unseparable cover rotatably and integrally connected to a main housing, which prevents the loss of the cover and reduces the size of the earset.

Still another object of the present invention is to provide an earset holder for keeping an ear speaker stand on the floor, thereby preventing the loss of an ear set.

Still another object of the present invention is to provide an earset having a built-in communication module fitted into the ear of a user to improve user convenience.

In accordance with one aspect of the present invention for accomplishing the above objects, there is provided an earset including a main housing with a microphone and an ear speaker mounted therein; a cover rotatably connected to the main housing and rotating along a first hinge axis to expose or close the ear speaker, the ear speaker being exposed with rotation of the cover and rotating along a second hinge axis to project out from the main housing and to be fitted into the ear of a user; and first and second hinge devices providing the first and second hinge axes, respectively, and rotatably connecting the cover and the ear speaker to the main housing.

In accordance with another aspect of the present invention, there is provided an earset including a main housing with a microphone and an ear speaker mounted therein; a cover detachably connected to the main housing, the ear speaker being exposed with detachment of the cover from the main housing and rotating along a second hinge axis to project out from the main housing and to be fitted into the ear of a user;

and a hinge device providing the first hinge axis and rotatably mounting the ear speaker in the main housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. Descriptions of well-known functions and constructions are omitted for clarity and conciseness.

Figure 1:
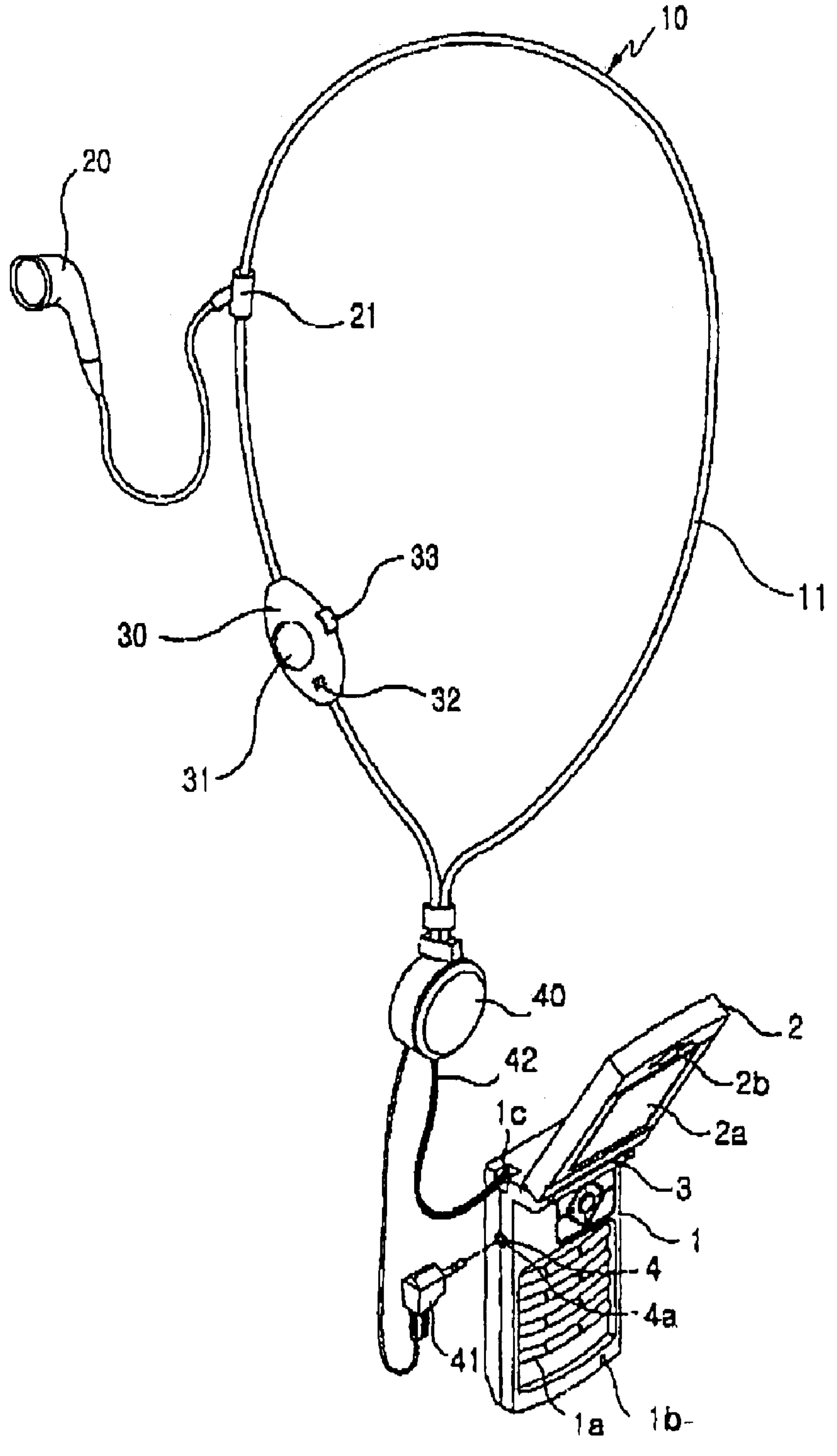
FIG.1 (PRIOR ART)
FIG. 1 is a view illustrating a conventional folder-type mobile terminal with a necklace-type earset connected thereto.
Figure 2:
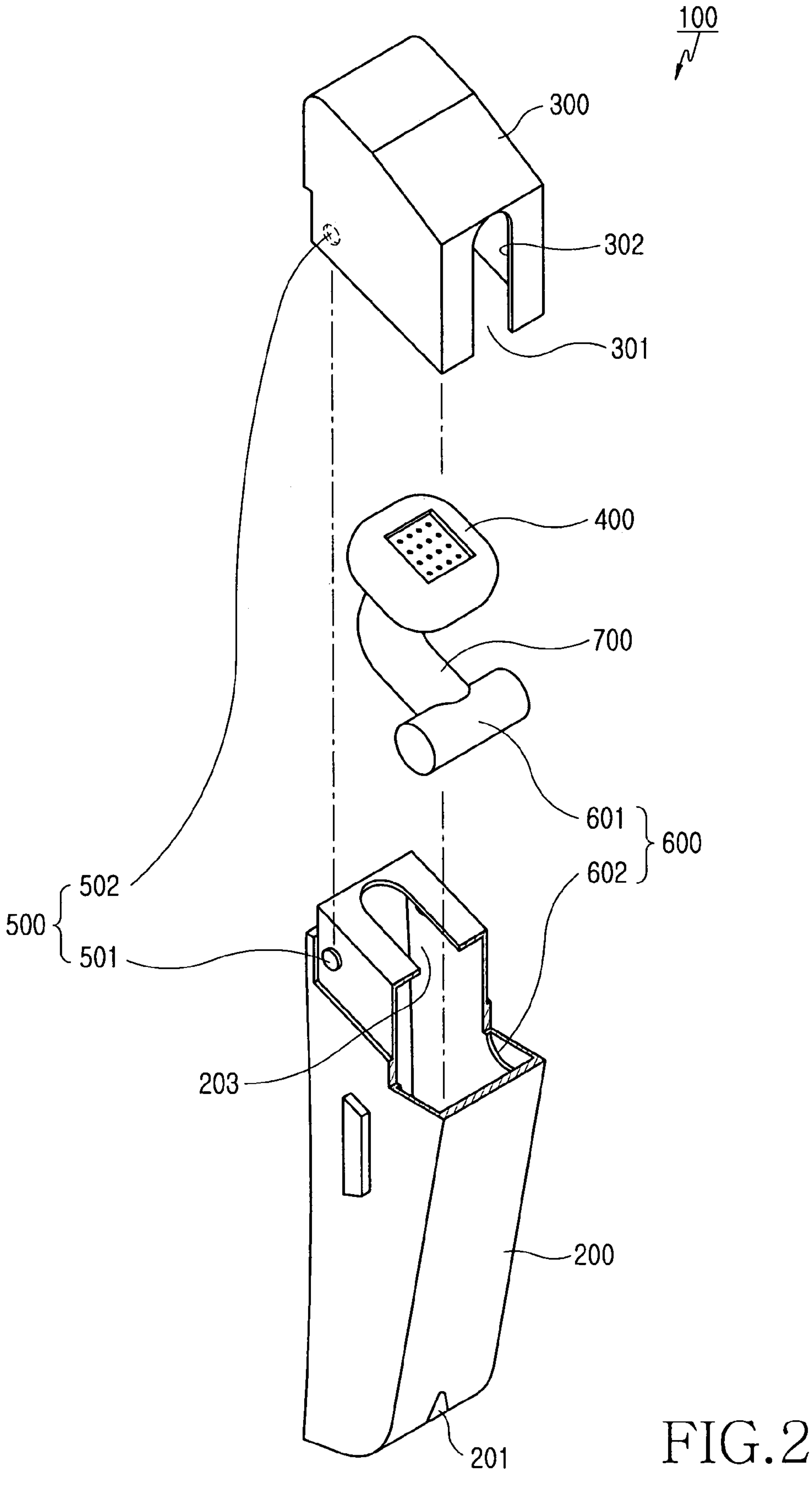
FIGS. 2 to 10 are views illustrating an earset according to a first embodiment of the present invention.
Figure 3:
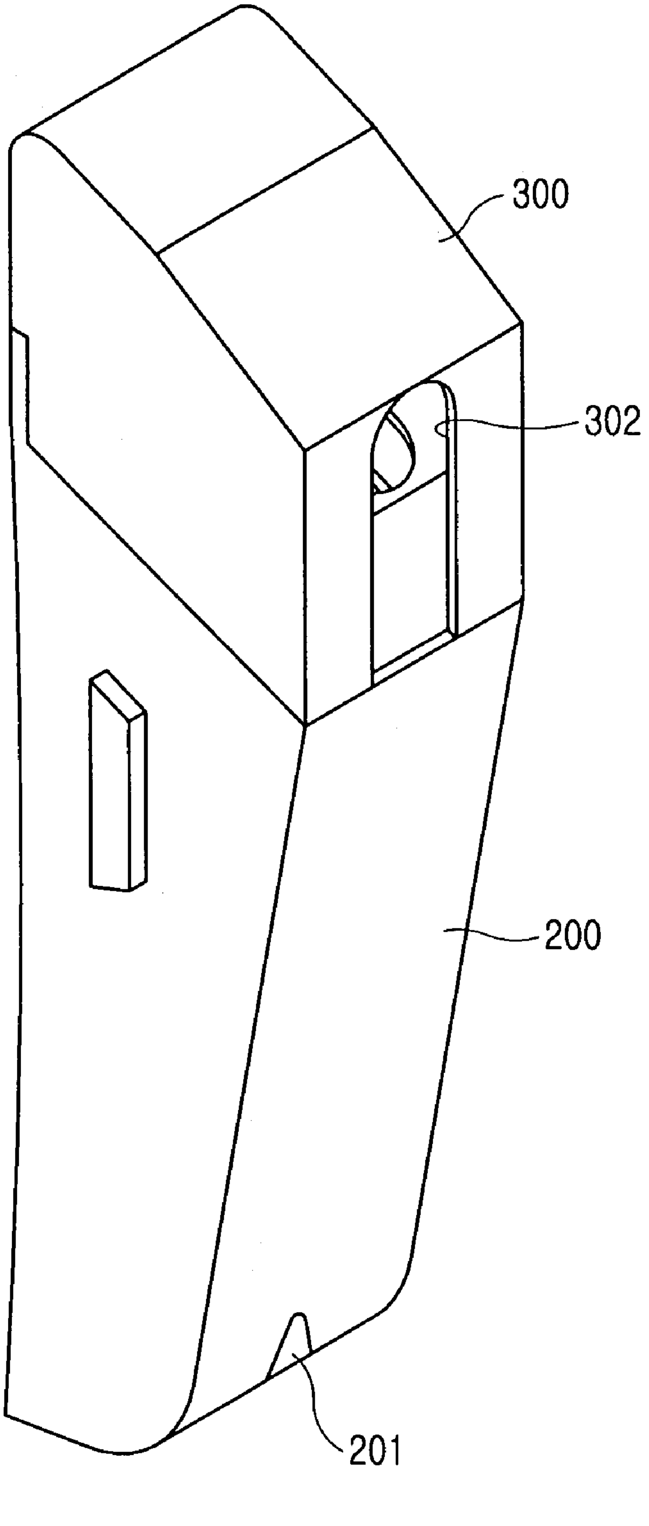

FIGS. 2 to 10 show an example of an earset according to the present invention. Referring to FIGS. 2 and 3, the earset 100 includes a main housing 200, a cover 300, an ear speaker 400, and first and second hinge devices 500 and 600. A short range communication module (not shown) for performing wireless communication, a microphone 201 and the ear speaker 400 are mounted within the main housing 200. The short range communication module (not shown) adopts, as a short range communication standard, a Bluetooth system that connects communication devices located in a short range to one another using a wireless network and enables real-time interactive communication without complicated wires. The cover 300 which is rotatably connected to the main housing 200 can be rotated around a first hinge axis A1 to expose or cover the ear speaker 400 mounted in the main housing 200. In other words, the ear speaker 400 is exposed with the rotation of the cover 300. The ear speaker 400 is rotatably mounted in the main housing 200. The ear speaker 400 can be rotated around a second hinge axis A2 to project out from the main housing 200 and to be fitted into the ear of a user. The first and second hinge devices 500 and 600 provide the first and second hinge axes A1 and A2, respectively, and rotatably connect the cover 300 and the ear speaker 400 to the main housing 200.

Figure 4:
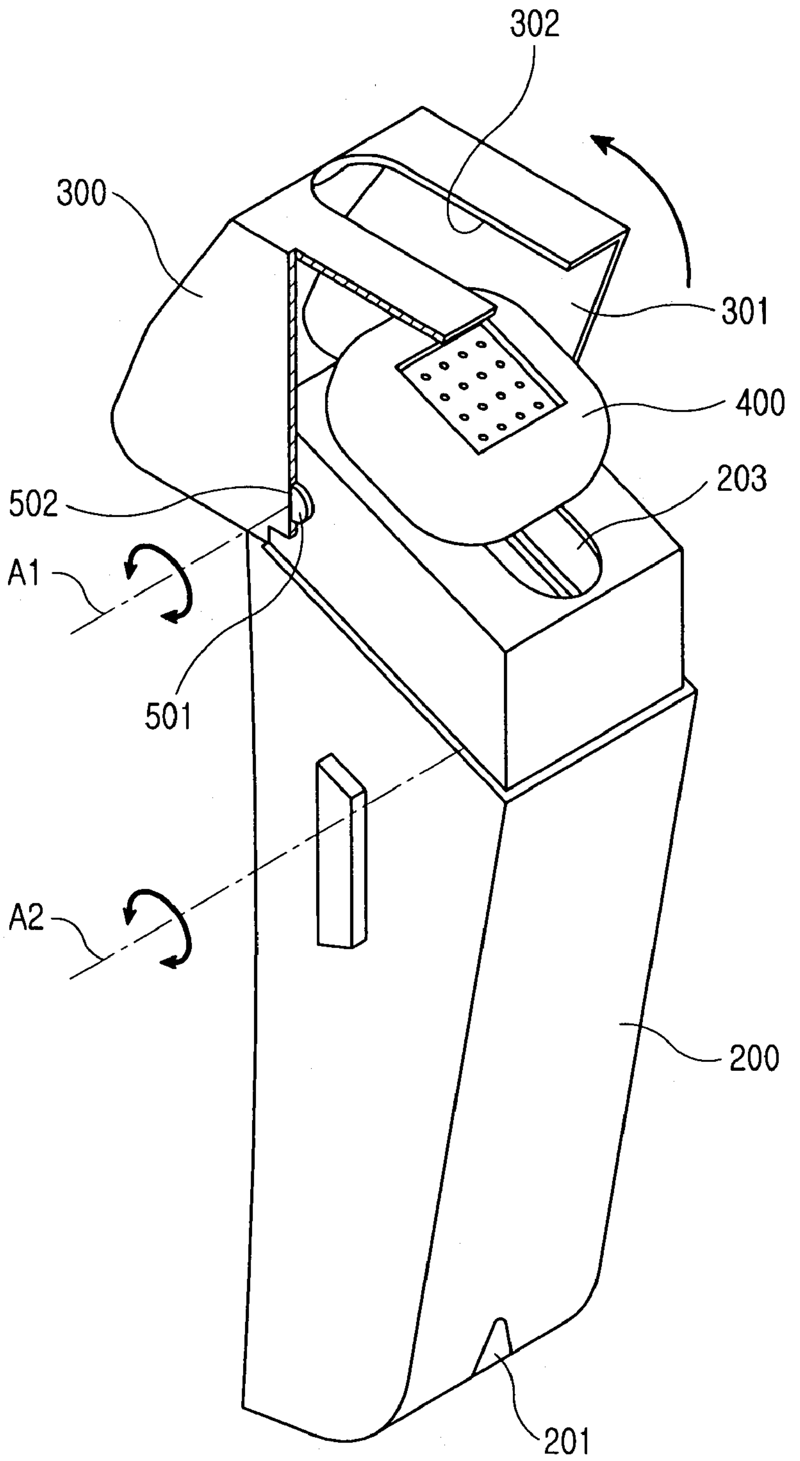

Referring to FIGS. 2 and 4, the main housing 200 has the first and second hinge devices 500 and 600 on top thereof to allow the cover 300 and the ear speaker 400 rotate. The microphone 201 is provided at a lower end of the main housing 200. The short range communication module (not shown) is mounted within the main housing 200 to perform short-range wireless communication.

As shown in FIG. 4, the cover 300 has a mount space 301 to sufficiently mount the ear speaker 400 thereunder when it is closed.

Figure 7:
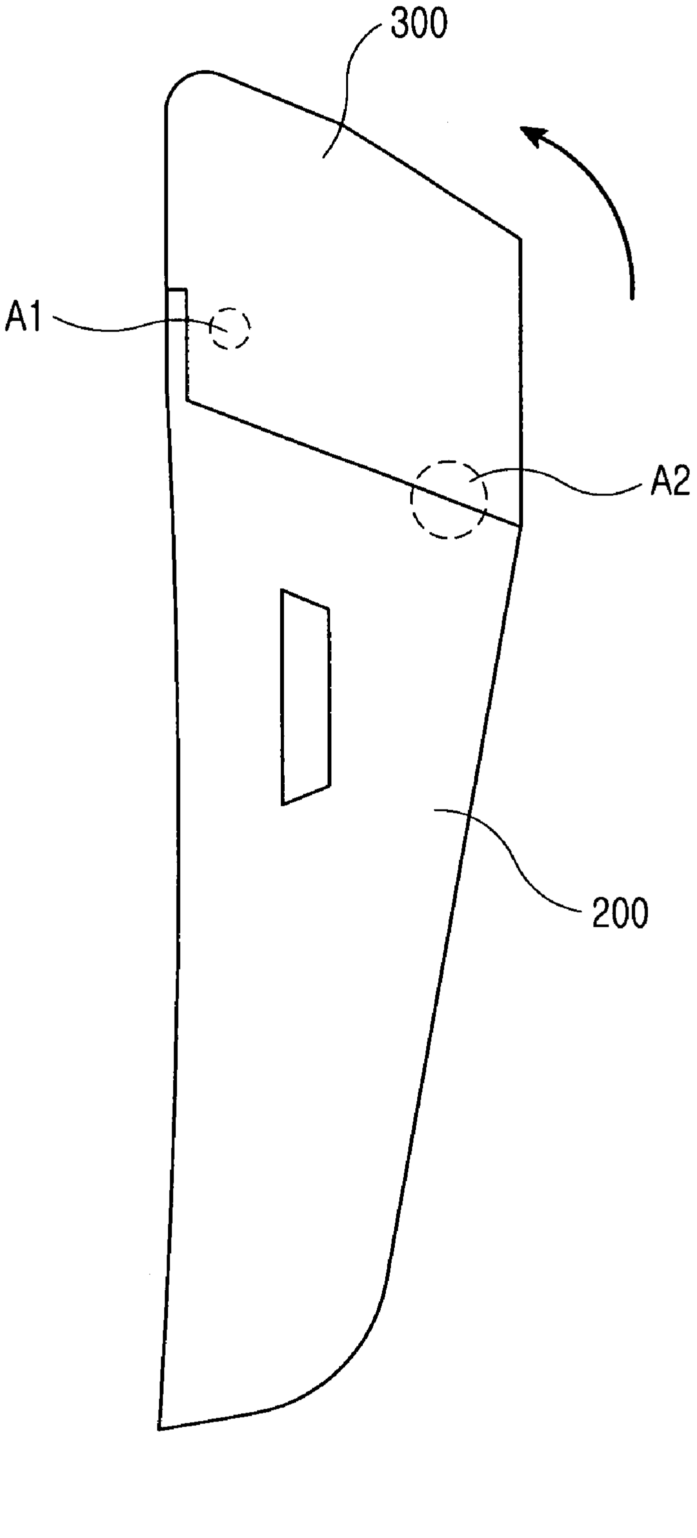
Figure 8:
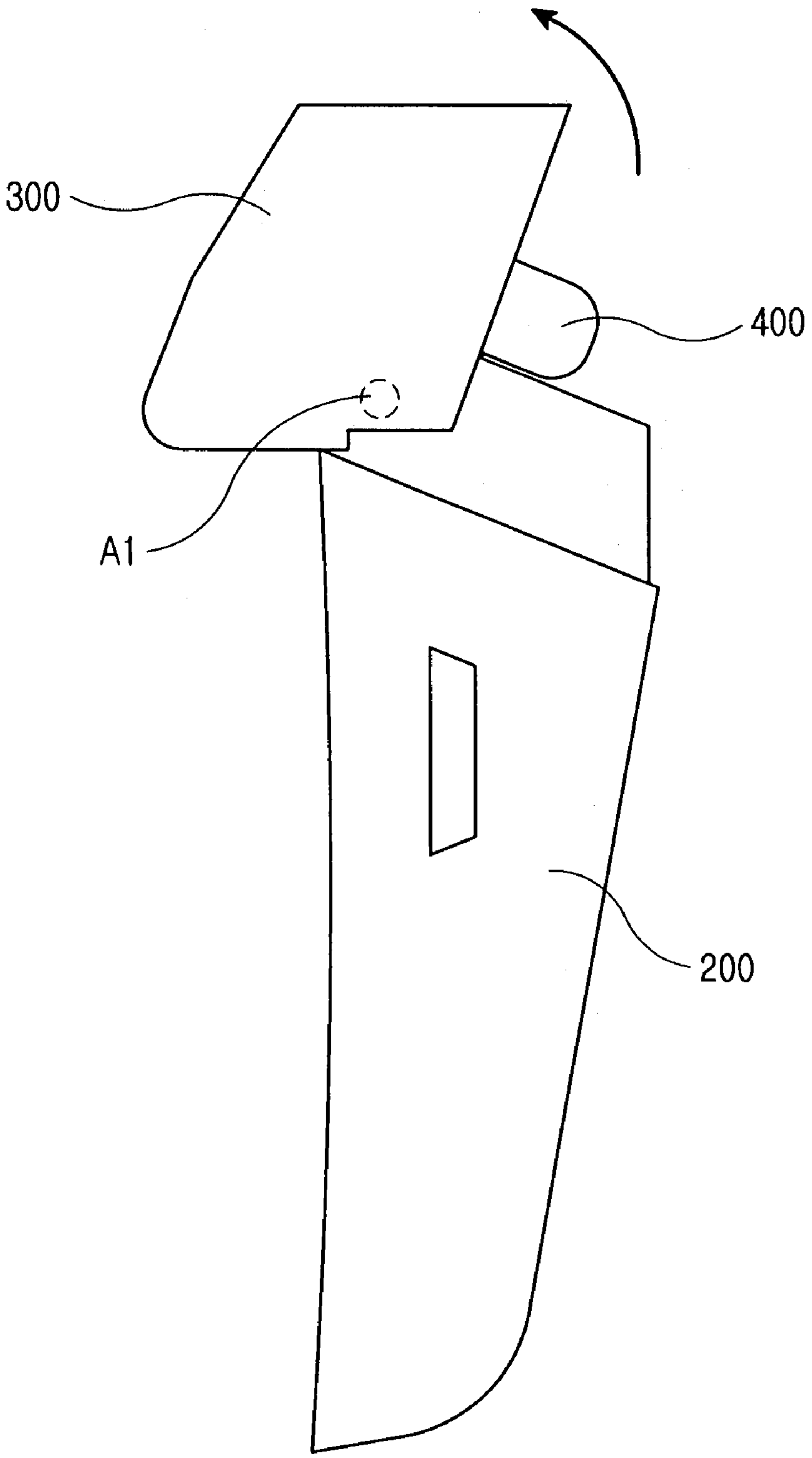

As shown in FIGS. 4, 7 and 8, the first hinge device 500 includes a pair of hinge members 501 formed on the main housing 200 and a pair of hinge holes 502 defined through the cover 300. The hinge members 501 are protruded from the main housing 200 and are rotatably inserted into the hinge holes 502 of the cover 300 to make the cover 300 rotatable around the first hinge axis A1.

Figure 5:
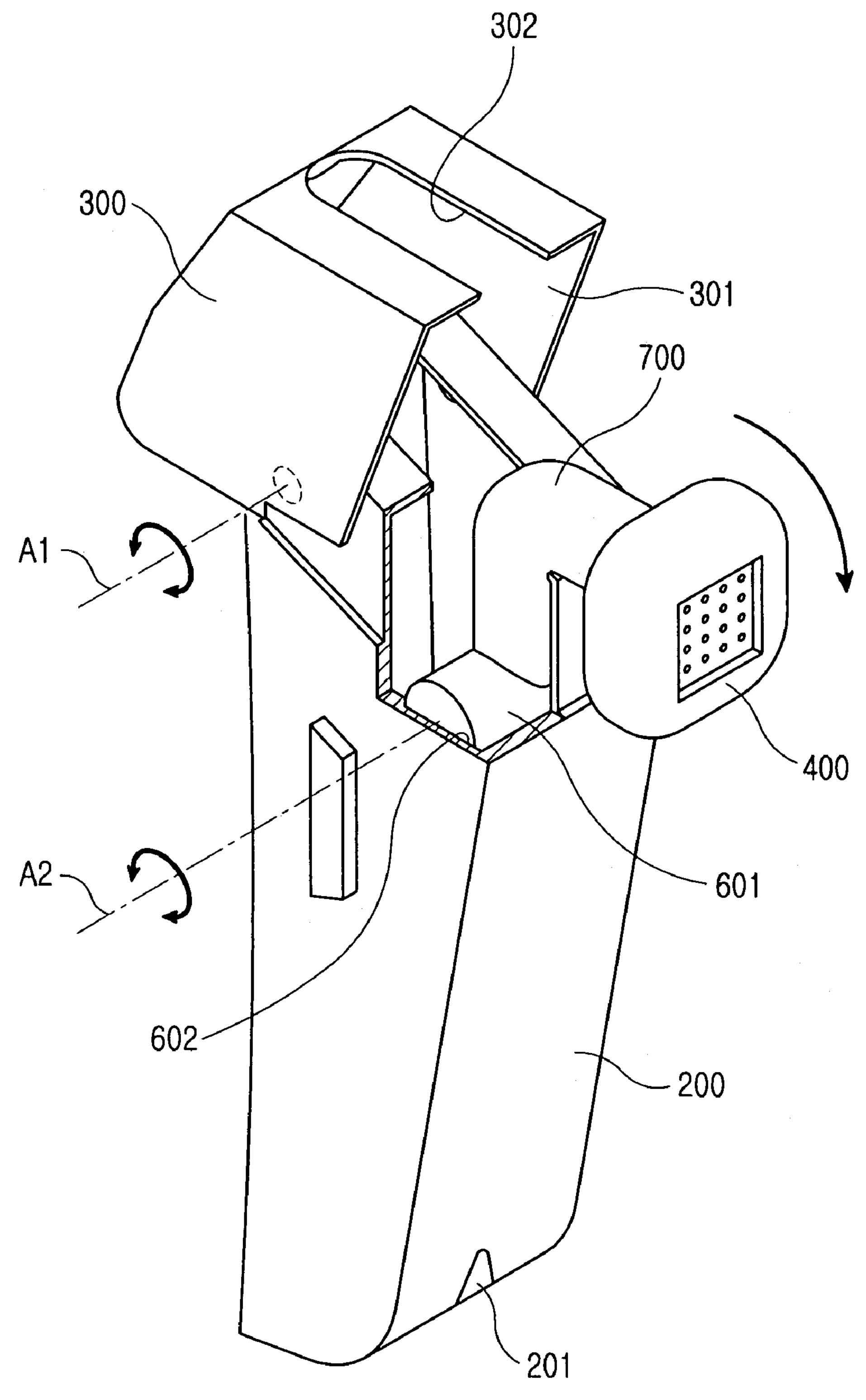
Figure 9:
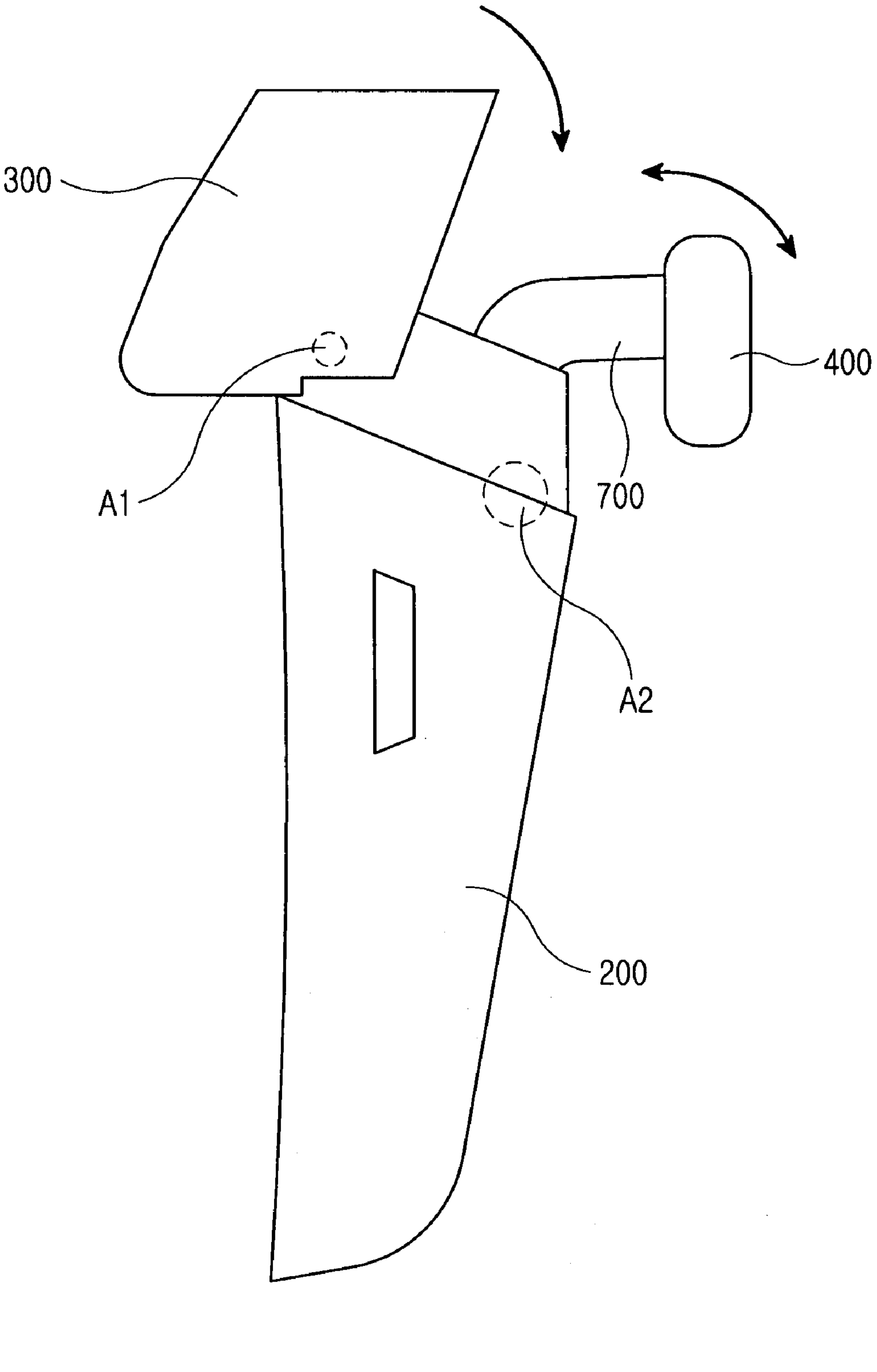

Referring to FIGS. 5 and 9, the second hinge member 600 includes a hinge arm 601 and a pair of hinge grooves 602. The hinge arm 601 is provided on the ear speaker 400 and rotatably coupled to the hinge grooves 602 formed on the main housing 200 so the ear speaker 400 can rotate around the second hinge axis A2. Also, a support member 700 for rotatably supporting the ear speaker 400 is provided between the ear speaker 400 and the hinge arm 601. The support member 700 has a rectangular shape.

As shown in FIG. 4, the main housing 200 also has an opening 203 for receiving the support member 700 according to the rotation of the ear speaker 400.

Figure 6:
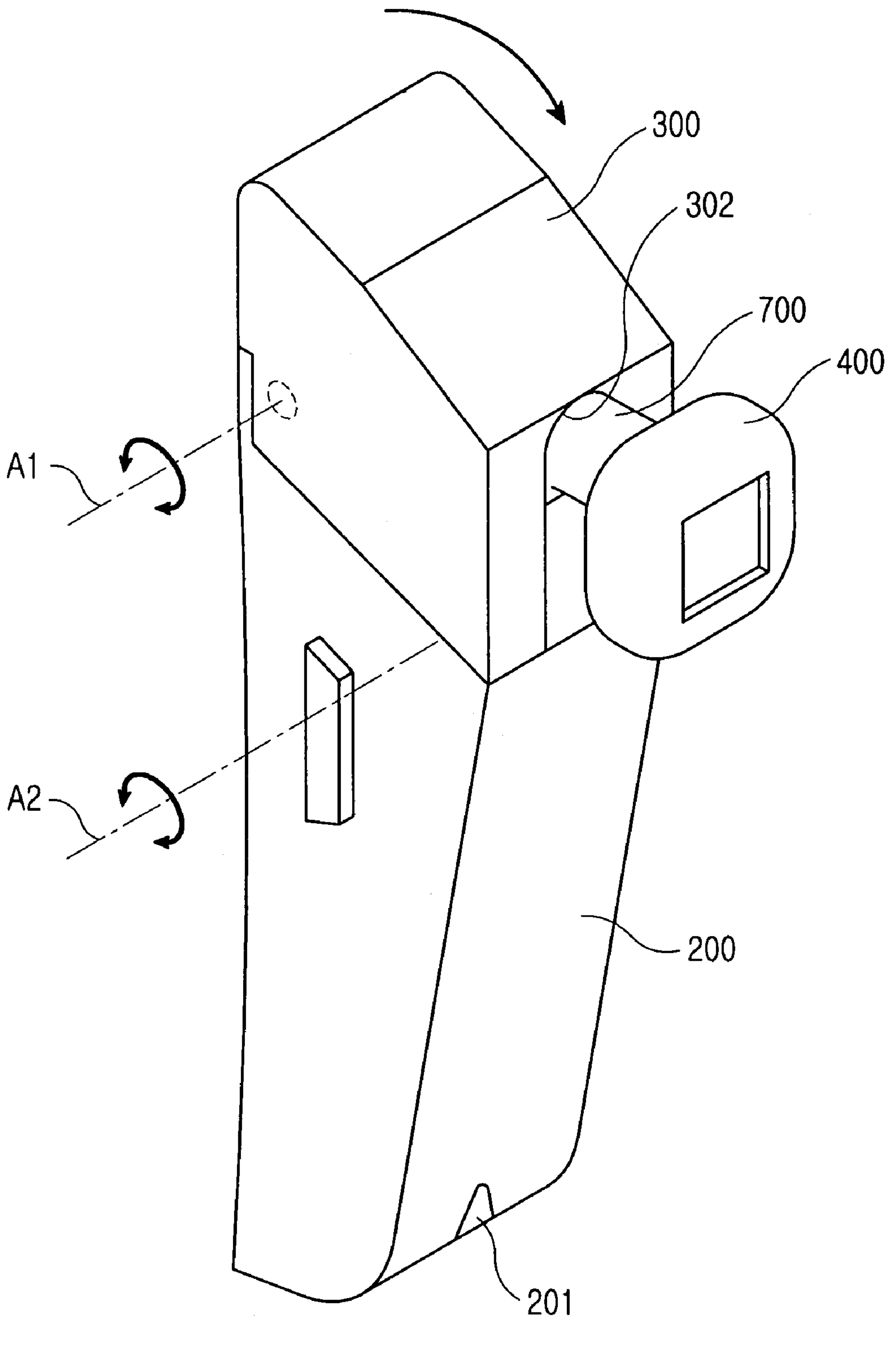
Figure 10:
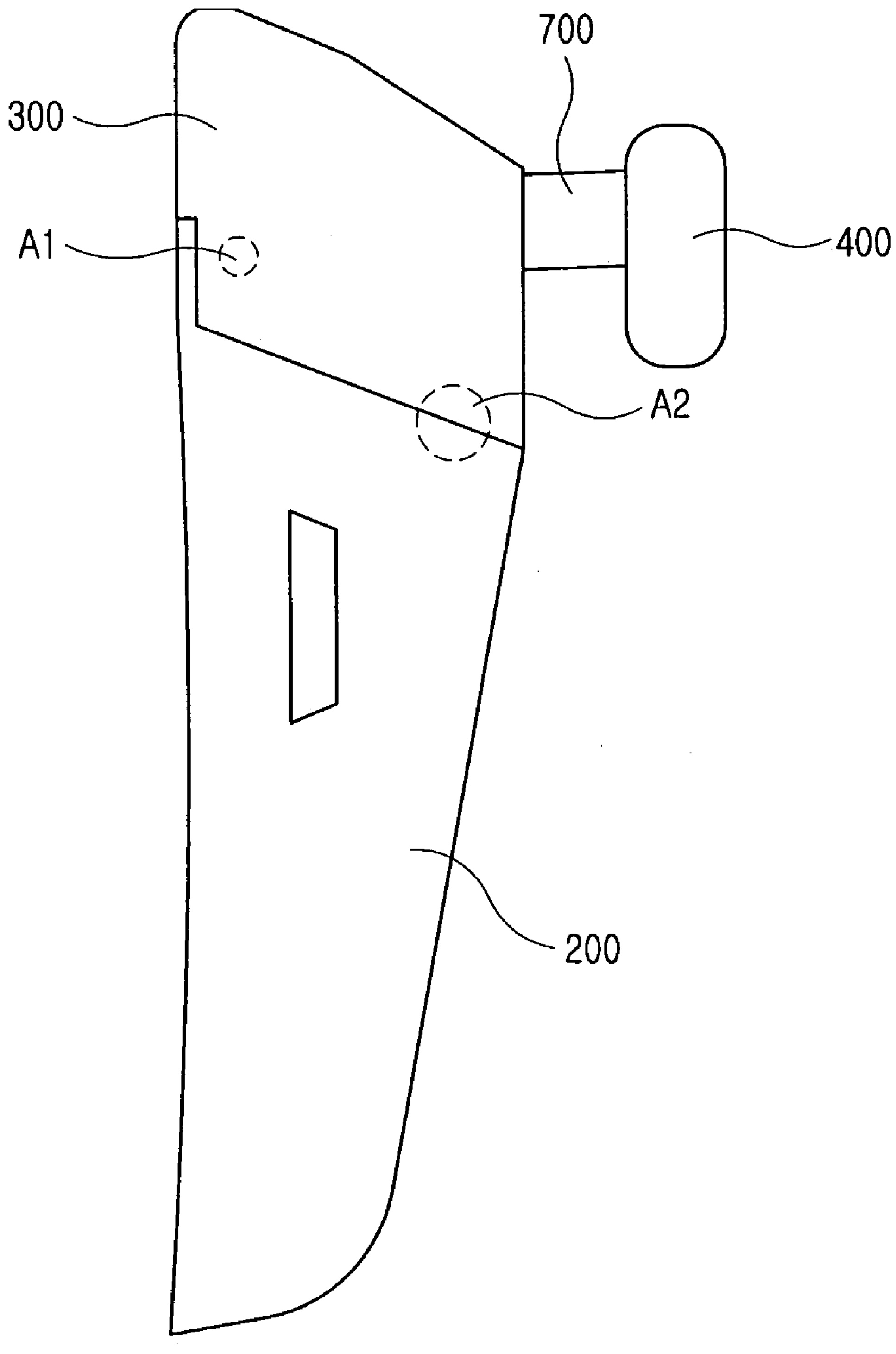

As shown in FIGS. 6 and 10, the user can rotate the ear speaker 400 around the second hinge axis A2 in a forward direction so the ear speaker 400 can project out from the main housing 200. Then the user can close the cover 300 by rotating the cover 300 around the first hinge axis A1 in a forward direction. The cover 300 has a stopper portion 302 for guiding the support member 700 of the ear speaker 400 thereunder and restricting rotation of the ear speaker 400 in the opposite direction. The stopper portion 302 has an inverted U (∩) shape to keep the support member 700 thereunder.

The function and operation of the earset 100 according to the present invention will be explained with reference to FIGS. 2 to 10.

As shown in FIGS. 2 and 3, the earset 100 includes the main housing 200 with the microphone 201 and the ear speaker 400 mounted therein, the cover 300, and the first and second hinge devices 500 and 600 provided on top of the main housing 200. The microphone 201 is provided at the lower end of the main housing 200. Also, a short range communication module (not shown) is mounted within the main housing 200.

As shown in FIG. 5, the second hinge device 600 includes a hinge arm 601 provided on the ear speaker 400 and a pair of hinge grooves 602 formed on the main housing 200. The hinge arm 601 is rotatably coupled to the hinge grooves 602. Then, the support member 700 of the ear speaker 400 is mounted within the opening 203 of the main housing 200.

As shown in FIG. 4, the first hinge device 500 includes a pair of hinge members 501 and a pair of hinge holes 502. The hinge members 501 protruded from the main housing 200 are rotatably inserted into the hinge holes 502 defined through the cover 300.

In order to use the earset 100, a user has to first rotate the cover 300 around the first hinge axis A1 in a backward direction to be away from the main housing 200, as shown in FIGS. 7 and 8.

The ear speaker 400 mounted in the main housing 200 is exposed, as shown in FIGS. 4 and 8.

When the user holds the exposed ear speaker 400 and pull it out, the ear speaker 400 rotates around the second hinge axis A2, which makes the support member 700 rotate and protrude out from the opening 203 of the main housing 200, as shown in FIGS. 6 and 9.

With the rotation of the support member 700, the ear speaker 400 projects outward from the main housing 200 to a predetermined length, as shown in FIG. 9.

The user may close the cover 300 again by rotating the cover 300 around the first hinge axis A1 in a forward direction to be closer to the main housing 200, as shown in FIG. 6. The stopper portion 302 formed on the cover 300 is engaged with the support member 700 to restrict the movement of the ear speaker 400. The stopper portion 302 has an inverted U (∩) shape to be engaged with the support member 700.

Then the user can fit the projecting ear speaker 400 into the ear and use the earset 100.

While not using the earset 100, the user may put the ear speaker 400 in the main housing 200, as shown in FIGS. 3 and 7, by rotating the cover 300 around the first hinge axis A1 in the backward direction, rotating the projecting ear speaker 400 around the second hinge axis A2 in the backward direction to place the support member 700 in the opening 203, and rotating the cover 300 around the first hinge axis A1 in the forward direction to cover the ear speaker 400. Then the ear speaker 400 is exposed.

Since the ear speaker 400 is covered by the cover 300, the ear speaker 400 can be protected from damage and dirt contamination.

Figure 11:
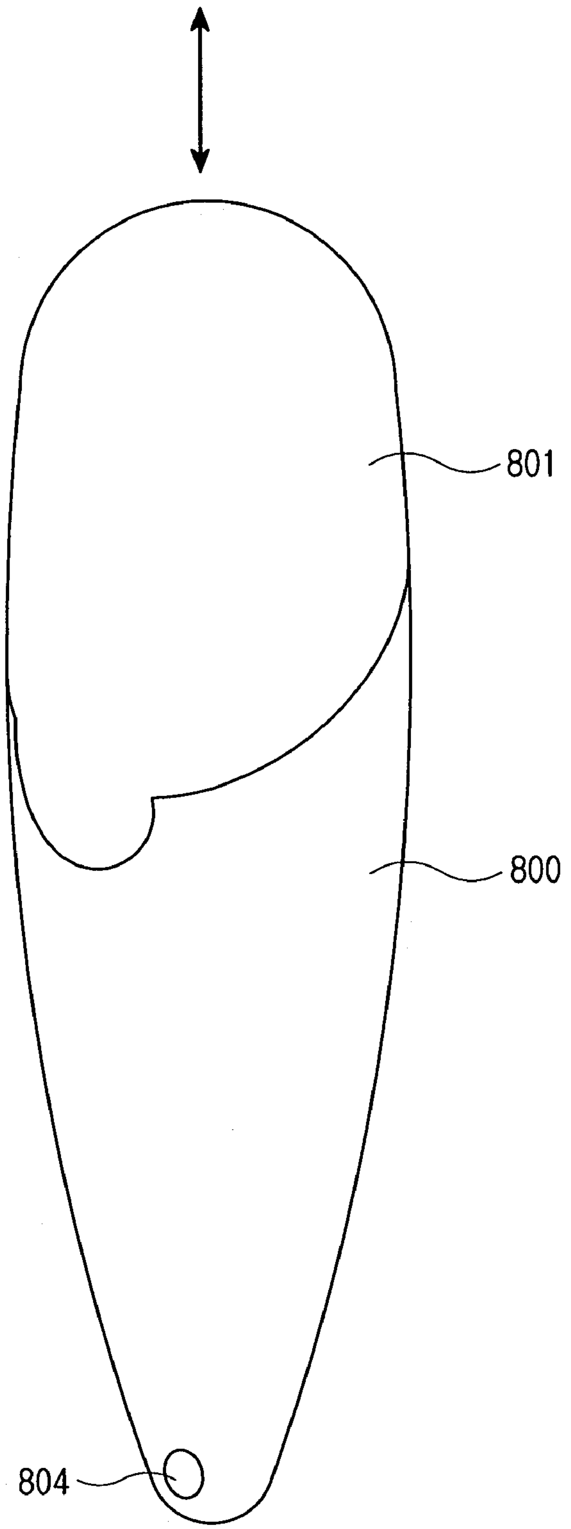
FIGS. 11 to 13 are views illustrating an earset according to a second embodiment of the present invention.
Figure 12:
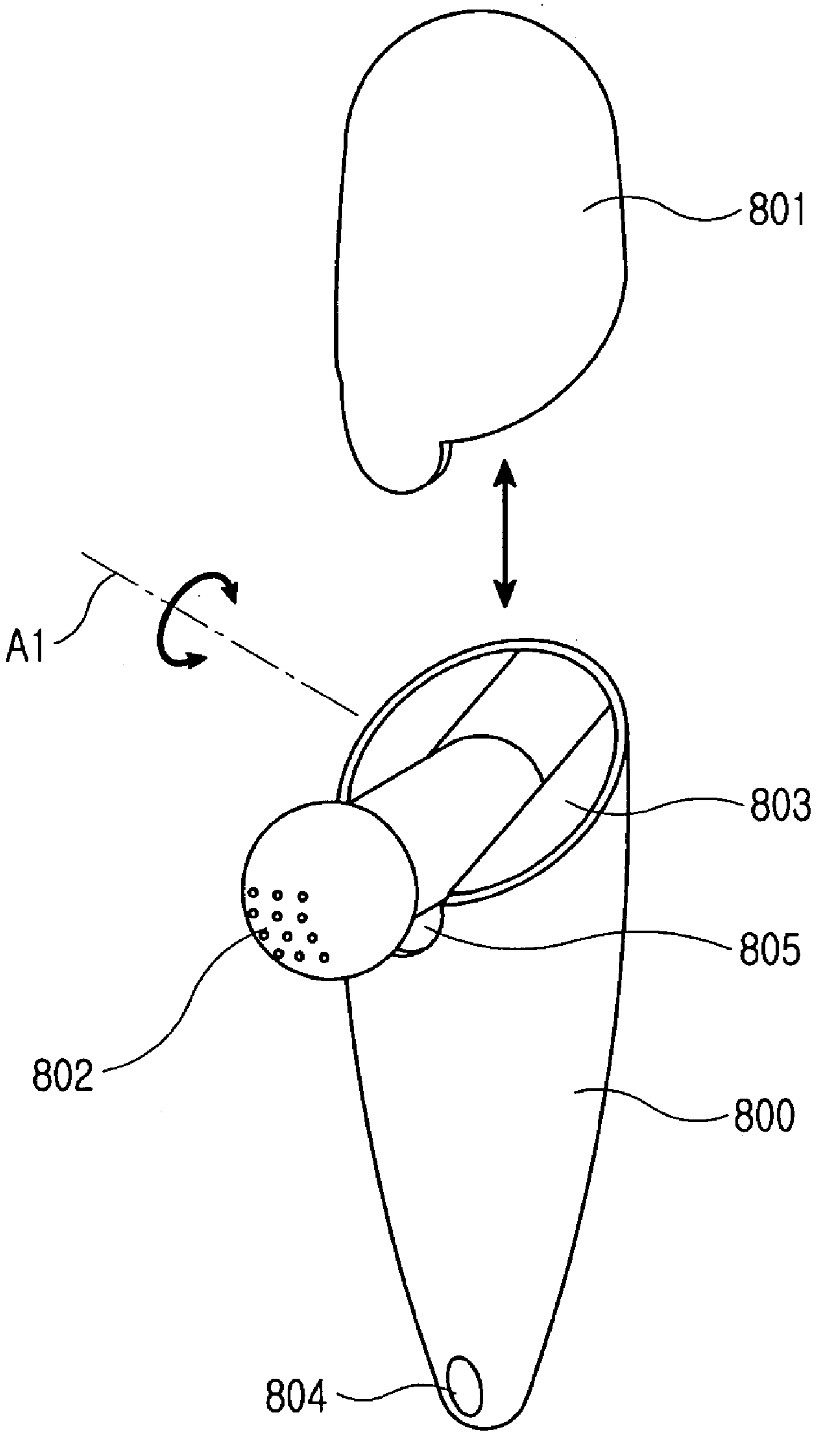
Figure 13:
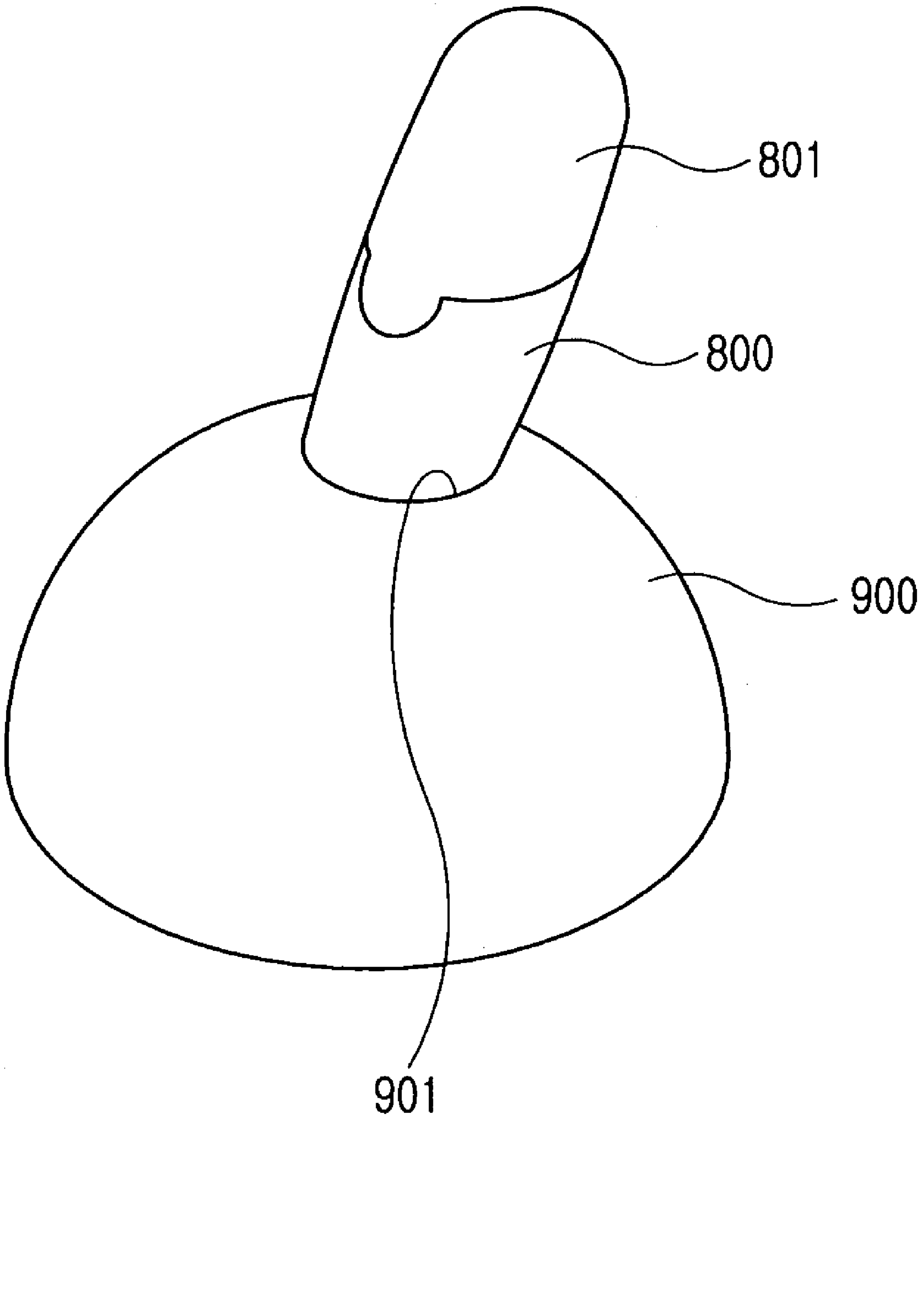

FIGS. 11 to 13 show another example of an earset according to the present invention. The structure and operation of the earset will be explained below.

As shown in FIGS. 11 and 12, the earset includes a main housing 800 with a short range communication module (not shown), a microphone 804 and an ear speaker 802 mounted therein, a cover 801, and a hinge device 803.

In order to use the earset, the user has to separate the cover 801 from the main housing 800.

The ear speaker 802 mounted on the upper portion of the main housing 800 is exposed, as shown in FIG. 12. The ear speaker 802 can be rotated around a first hinge axis A1 to project out from the main housing 200 to a predetermined length. Since the main housing 800 has a fixing groove 805 for holding the projecting ear speaker 802, the user can rotate the ear speaker 802 and insert it in the fixing groove 805.

Then the user can fit the ear speaker 802 into the ear and use the earset.

While not using the earset, the user may rotate the ear speaker 802 around the first hinge axis A1 in a backward direction to place it within the main housing 800, and then connect the separated cover 801 to the main housing 800 in order to protect the ear speaker 802 as shown in FIG. 11.

FIG. 13 shows another example of an earset holder for holding an earset according to the present invention. The main housing 800 can be kept on the earset holder 900.

The earset holder 900 has an engagement groove 901 at the top center thereof. The user can place the earset on the earset holder 900 by inserting the lower part of the main housing 800 into the engagement groove 901.

The user can use the earset by simply getting it out from the earset holder 900.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An earset comprising:
a main housing with a microphone and an ear speaker mounted therein;
a cover rotatably connected to the main housing and rotating along a first hinge axis to expose or close the ear speaker, the ear speaker being exposed with rotation of the cover and rotating along a second hinge axis to be protruded out from the main housing and fitted into the ear of a user; and
first and second hinge devices providing the first and second hinge axes, respectively, and rotatably connecting the cover and the ear speaker to the main housing.

2. The earset according to claim 1, wherein the main housing includes the first and second hinge devices provided on top thereof, a microphone provided at a lower end thereof, and a short range communication module mounted therein.

3. The earset according to claim 1, wherein the cover includes a mount space for mounting the ear speaker thereunder.

4. The earset according to claim 1, wherein the first hinge device includes a pair of hinge holes defined through the cover and a pair of hinge members protruded from the main housing and rotatably inserted into the hinge holes.

5. The earset according to claim 1, further comprising a support member provided between the ear speaker and a hinge arm to rotatably support the ear speaker.

6. The earset according to claim 1, wherein the second hinge device includes a pair of hinge grooves formed on the main housing and a hinge arm provided on the ear speaker and rotatably coupled to the hinge grooves.

7. The earset according to claim 6, further comprising a support member provided between the ear speaker and the hinge arm to rotatably support the ear speaker.

8. The earset according to claim 7, wherein the support member is rectangularly shaped.

9. The earset according to claim 7, wherein the main housing further includes an opening for receiving the support member.

10. The earset according to claim 7, wherein the cover further includes a stopper portion for keeping the support member thereunder and restricting rotation of the ear speaker when the user rotates the ear speaker around the second hinge axis to project the ear speaker out from the main housing and then rotates the cover around the first hinge axis to cover the main housing.

11. The earset according to claim 10, wherein the stopper portion has an inverted U (∩) shape to keep the support member thereunder.

12. An earset comprising:
a main housing with a microphone and an ear speaker mounted therein;
a cover detachably connected to the main housing;
the ear speaker exposed with detachment of the cover from the main housing and rotating along a second hinge axis to be protruded out from the main housing and fitted into the ear of a user; and
a hinge device providing a first hinge axis and rotatably mounting the ear speaker in the main housing.

13. The earset according to claim 12, wherein the main housing further includes a fixing groove for holding the ear speaker rotated and protruded outward.

14. The earset according to claim 12, wherein the main housing is formed in a cylindrical shape and the earset further comprises an earset holder with an engagement groove into which the cylindrical main housing can be inserted.

* * * * *